May 15, 1928.
A. J. LUSH
1,669,619
ELECTRIC METER
Filed April 9, 1925
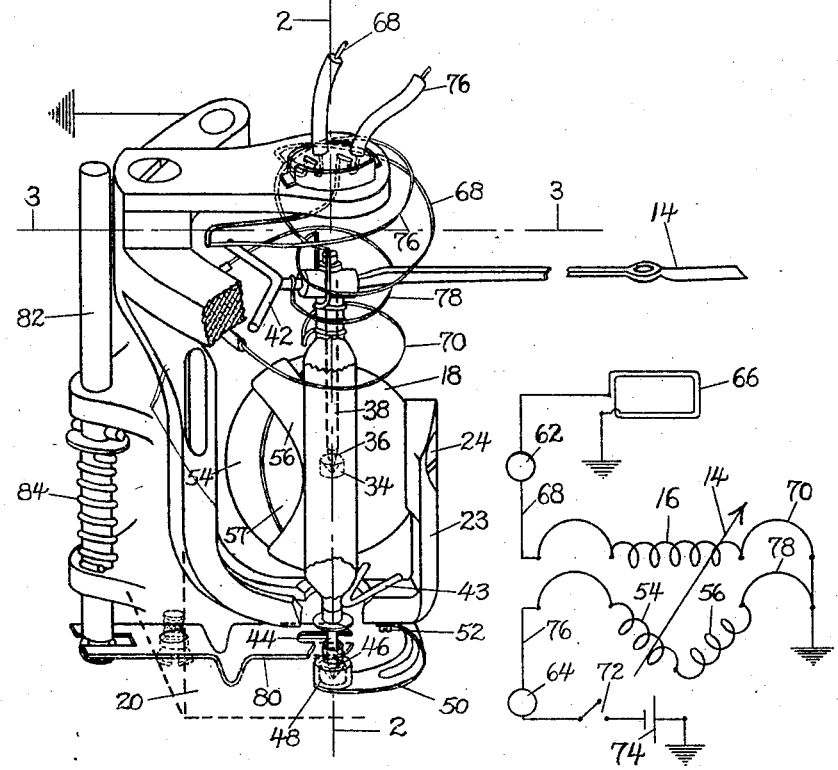
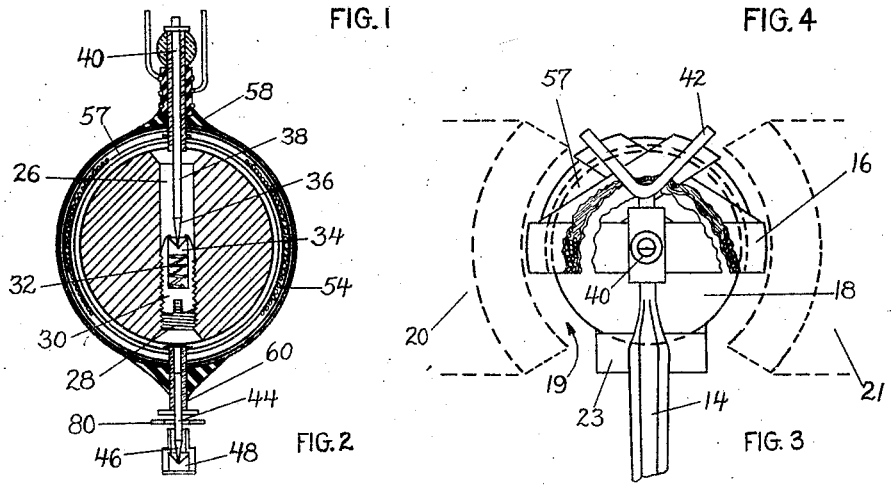
INVENTOR
A.J. LUSH
BY
David Rines
ATTORNEY Patented May 15, 1928.

1,669,619

UNITED STATES PATENT OFFICE.

ARTHUR JOHN LUSH, OF WALTHAM, MASSACHUSETTS, ASSIGNOR TO RAWSON ELECTRICAL INSTRUMENT COMPANY, OF CAMBRIDGE, MASSACHUSETTS, A CORPORATION OF MASSACHUSETTS.

ELECTRIC METER.

Application filed April 9, 1925. Serial No. 21,808.

The present invention relates to electric meters.

In electric meters of the double-pivot type, the weight is concentrated upon the lower pivot, which is carried by the lower jewel bearing, so that the upper pivot rests against a side of the upper jewel, instead of against the apex thereof. The friction that is thereby introduced at the upper pivot is objectionable, particularly in the case of highly sensitive instruments. Meters of the single-pivot type are more free from this difficulty, but they are, in their turn, objectionable because a very slight jar or disturbance causes the meter indicator to wobble.

It is therefore an object of the present invention to provide a meter having two pivots, but which, nevertheless, shall have the advantages of the single-pivot type, and shall be free from the disadvantages of the double-pivot type.

With this end in view, a feature of the invention resides in causing the greater part of the weight of the moving parts to be carried by one bearing, and to cause a second bearing to be yieldingly maintained in engagement with a second pivot. The second bearing may carry a portion of the weight of the moving parts. In the specific embodiment of the invention that is herein illustrated and described, the one bearing is an upper bearing and the second bearing is a lower bearing.

A further object of the invention is to provide an improved coil-carrying shell.

A still further object is to eliminate the use of control springs or the like in meters of this type.

Further objects will be explained hereinafter and will be particularly pointed out in the appended claims.

With the above ends in view, the invention consists of the improved meter, a preferred embodiment of which is hereinafter described, illustrated in the accompanying drawings, and defined in the appended claims.

In the drawings, Fig. 1 is a perspective view, partly broken away, illustrating the invention in preferred form; Fig. 2 is a vertical section, taken upon the line 2—2 of Fig. 1, looking in the direction of the arrows; Fig. 3 is a horizontal section, partly broken away, taken upon the line 3—3 of Fig. 1, looking in the direction of the arrows; and Fig. 4 is a diagrammatic view of circuits and apparatus arranged according to a preferred embodiment of the present invention.

Meters of the type under consideration commonly comprise a pointer or other indicator 14, adapted to be actuated by the magnetic flux consequent upon an electric current flowing through a winding 16, surrounding an iron or steel core 18, which is mounted between pole pieces 20 and 21 of a magnet,—usually a permanent magnet, though it may be an electro-magnet. The core is shown secured to a support 23 by a screw 24. The core 18 is provided with a vertically disposed bore 26, the lower portion of which is screw-threaded, as shown at 28, to receive a hollow screw 30, within which is seated a spring 32, upon which rests a main jewel bearing 34. Upon the bearing 34 rests a pivot 36, that is carried at the lower end of a vertically disposed spindle 38 that is fixed to the pointer 14. The pointer 14 is secured to the spindle 38 at 40, at right angles thereto, so as to swing horizontally about the pivot 36. The pointer 14 and the parts attached thereto are provided with counter-weights 42 and 43, so constructed and designed that the pointer and the said parts shall be balanced about the pivot 36, so as to swing in a horizontal direction about the pivot.

A pointer so mounted is liable to wobble in response to very slight jars. On the other hand, if the pointer is provided with a second pivot and a second jewel bearing, as in the double-pivot meters of the prior art, the objectionable frictional binding effect above-described will be introduced. According to the present invention, however, the pointer assembly is provided with a second vertically disposed spindle 44, alined with the spindle 38, and having at its lower end a second pivot 46. A movable, jewel bearing 48 is maintained yieldingly in engagement with the pivot 46 by a spring 50, at one end of which it is mounted and the other end of which is secured to the support 23 at 52. The bearings 34 and 48 are each below its pivot so that each pivot rests on its bearing. The major portion of the weight of the pointer and connected parts is carried by the bearing 34. A portion of this weight, however, is supported by the spring tension of the spring 50, acting on the pivot 46, through the bearing 48. The chief function of the bearing 48, however, is to keep the spindles 38 and 44 vertically disposed, and thus to ensure the pointer swinging horizontally and to prevent the pointer from wobbling.

Meters of the single-pivot type are ordinarily provided with a spring that serves the double purpose of stabilizing the pointer 14 and opposing the action of the coil 16 upon the magnetic field 19 produced by the pole pieces 20 and 21. Such a spring may be used also in meters of some types constructed according to the present invention. According to the illustrated embodiment of the present invention, however, no such spring is necessary. Instead, two opposing coils 54 and 56 are provided. These coils act to return the pointer to its normal or zero position from the position to which it has been actuated by the coil 16, as before described. According to the illustrated embodiment of the invention, two separate coils 54, 56 are provided, connected in series so as to oppose each other. It is possible, however, in meters of other types, to employ but a single coil, and to have this coil oppose the action of the coil 16.

A convenient way of mounting the coils 16, 54 and 56 is to wind them upon a shell 57. This shell may be of any desired shape and construction. It is preferred, however, to have the shell substantially hemispherical in shape, though a little larger than a hemisphere. The coil 16 may be wound substantially along a diametrical circle of the sphere 18. The coils 54 and 56 may be wound along small circles of this sphere, but symmetrically disposed, as shown. The diameter of the hemisphere is slightly larger than the diameter of the core 18, and the hemisphere is so designed that there shall be a small clearance between the hemisphere and the core so as to provide for a free swinging movement of the hemisphere about the core. This construction readily lends itself to mounting the spindles 38 and 44 directly upon the shell. The spindle 38 may be secured to the upper portion of the shell, and the spindle 44 may be secured to the lower portion. According to the specific construction illustrated in Fig. 2, the spindle 38 is fixed in an upper sleeve 58, and the spindle 44 in a lower sleeve 60 which are firmly secured to the shell 57 in any desired manner, as by means of soldering.

The coils 16, 54 and 56 may be connected to outside circuits in a manner that will now be described in connection with the diagrammatic circuits shown in Fig. 4. The meter is provided with binding posts 62 and 64 that are connected by suitable conductors with a search coil 66. The energy generated in the search coil 66 will traverse the coil 16 and thus cause the actuation of the pointer 14. The connections for effecting this result will now be described. The binding post 64 is grounded to any suitable portion of the meter frame, such as the support 23. The binding post 62 is connected by a conductor 68 with one terminal of the coil 16. The other termnial of the coil 16 is connected by a conductor 70 with a grounded portion of the instrument. The energy generated in the coil 16, therefore, will traverse a circuit from the grounded binding post 64, through the search coil 66, the binding post 62, the conductor 68, and the coil 16, back to the ground by way of the conductor 70.

The pointer 14 will thus become actuated from its normal or zero position and will tend to remain in actuated position. It may be returned to the normal position by the coils 54 and 56 the circuit of which is controlled by a switch 72. This circuit extends from the ground, by way of a battery 74 and a conductor 76, through the opposing coils 54, 56 in series, and by a conductor 78, back to the ground.

To prevent injury to the jewels 34 and 48, and to the pivots 36 and 46, the pointer, spindle, and shell may be lifted from the jewels and clamped in lifted position by means of a clamp 80 that may be actuated by a clamp plunger 82 which is normally maintained in ineffective position by a coil spring 84.

It will be obvious that the invention is not restricted to the exact embodiment thereof that is illustrated and described herein, and that modifications may be made by persons skilled in the art, without departing from the spirit and scope of the invention, as defined in the appended claims.

What is claimed is:

1. An instrument of the class described comprising a member having a pivot, a bearing for the pivot, the member being approximately balanced about the pivot and having a second pivot, a bearing for the second pivot and means for yieldingly maintaining the second pivot and the second-named bearing in engagement.

2. A meter comprising an indicator having two pivots one above the other, and a bearing for each pivot, the bearings each being on the same side of its corresponding pivot.

3. A meter comprising an indicator, two pivots disposed in substantially vertical alinement, and a bearing for each pivot, each bearing being below its corresponding pivot.

4. A meter comprising an indicator having a pivot, a main bearing for the pivot, the indicator being approximately balanced about the pivot and having a second pivot, a movable bearing for the second pivot, and means for yieldingly maintaining the movable bearing in engagement with the second pivot.

5. A meter comprising an indicator having a vertically disposed spindle provided with a pivot, a bearing for the pivot upon which the pivot rests, whereby the greater portion of the weight of the indicator is carried by the bearing, the indicator being approximately balanced to swing horizontally about the pivot, the indicator having a second pivot disposed below the first-named pivot, and a bearing upon which the second pivot rests.

6. An instrument of the class described comprising a member having a pivot, a main bearing for the pivot upon which the pivot rests, whereby the greater portion of the weight of the member is carried by the bearing, the member having a second pivot disposed below the first-named pivot, a movable bearing for the second pivot, and means for yieldingly maintaining the movable bearing in engagement with the second pivot.

7. A meter comprising an indicator having two vertically disposed pivots, a bearing for each pivot, each bearing being below its corresponding pivot, and means for lifting the pivots from the bearings to lift the indicator and clamp the indicator in lifted position.

8. A meter comprising an indicator having a pivot, a main bearing for the pivot, the indicator being approximately balanced about the pivot and having a second pivot below the first-named pivot, a movable bearing for the second pivot, each bearing being below its corresponding pivot, means for yieldingly maintaining the movable bearing in engagement with the second pivot, and means for lifting the pivots from the bearings to lift the indicator and clamp the indicator in lifted position.

9. An electric meter comprising a support, a magnetizable core mounted upon the support provided with a main bearing, a pointer having a vertically disposed spindle having a pivot resting upon the bearing, the pointer being counter-balanced, whereby the pointer is adapted to swing horizontally about the pivot, and the greater portion of the weight of the pointer is carried by the bearing, the pointer having a second pivot disposed below the first-named pivot, a movable bearing for the second pivot mounted upon the support and yieldingly maintained in engagement with the second pivot, and means adapted to be subjected to the influence of electric energy for swinging the pointer about the pivots.

10. An electric meter comprising an indicator having a pivot, a main bearing for the pivot, the indicator being approximately balanced about the pivot, the indicator having a second pivot, a movable bearing for the second pivot, means for yieldingly maintaining the movable bearing in engagement with the second pivot, means adapted to be subjected to the influence of an electric current for actuating the indicator from a normal position, a plurality of opposing coils, and means for causing an electric current to traverse the opposing coils for returning the indicator to the normal position.

11. An electric meter comprising a spherical magnetizable core provided with a vertically disposed bore, a bearing in the bore, an indicator having a vertically disposed spindle the lower end of which is provided with a pivot resting on the bearing, whereby the indicator is adapted to swing horizontally about the pivot, a substantially hemispherical shell secured to the spindle so as to swing therewith, a coil wound about the shell adapted to be traversed by an electric current for actuating the indicator from a normal position, a plurality of opposing coils wound about the shell, and means for causing an electric current to traverse the opposing coils for returning the indicator to the normal position.

12. An electric meter comprising a support, a spherical magnetizable core mounted upon the support provided with a vertically disposed bore, a main bearing in the bore, a pointer having a vertically disposed spindle the lower end of which is provided with a pivot resting upon the bearing, the pointer being counter-balanced, whereby the pointer is adapted to swing horizontally about the pivot and the greater portion of the weight of the pointer and parts mounted thereon are carried by the bearing, a substantially hemispherical shell secured to the spindle so as to swing therewith, the pointer having a second pivot disposed below the first-named pivot and the shell, a movable bearing for the second-named pivot mounted upon the support and yieldingly maintained in engagement with the second pivot, a coil wound about the shell adapted to be traversed by an electric current for actuating the pointer from a normal position, a plurality of opposing coils wound about the shell, and means for causing an electric current to traverse the opposing coils for returning the pointer to the normal position.

In testimony whereof, I have hereunto subscribed my name.

ARTHUR J. LUSH.